United States Patent
Harrison et al.

(10) Patent No.: US 6,282,975 B1
(45) Date of Patent: Sep. 4, 2001

(54) MOUNTING BRACKET FOR AUTOMATIC TRANSMISSION SHIFT CONTROL

(75) Inventors: Trevor Harrison; Erik C. Wilson, both of Fort Wayne, IN (US)

(73) Assignee: Navistar International Transportation Corp., Chicago, IL (US)

(*) Notice: Subject to any disclaimer, the term of this patent is extended or adjusted under 35 U.S.C. 154(b) by 0 days.

(21) Appl. No.: 09/304,759

(22) Filed: May 4, 1999

(51) Int. Cl.$^7$ .................................................. F16H 59/04
(52) U.S. Cl. ...................... 74/473.3; 74/473.1; 248/671
(58) Field of Search .................... 74/473.1, 473.3; 248/201, 300, 671

(56) References Cited

U.S. PATENT DOCUMENTS

| | | | |
|---|---|---|---|
| 1,468,522 | * 9/1923 | Snell et al. | 74/473.1 |
| 4,545,467 | * 10/1985 | Fernandez et al. | 74/473.1 X |
| 5,448,925 | * 9/1995 | McFadden | 74/335 |
| 5,560,255 | * 10/1996 | Willford et al. | 74/473.1 X |
| 5,887,485 | * 3/1999 | VanOrder et al. | 74/473.3 X |
| 5,979,263 | * 11/1999 | Tomida et al. | 74/473.3 |

* cited by examiner

*Primary Examiner*—David A. Bucci
*Assistant Examiner*—Colby Hansen
(74) *Attorney, Agent, or Firm*—Jeffrey P. Calfa; Dennis Kelly Sullivan Gilberto Hernandez; Neil T. Powell

(57) ABSTRACT

A one-piece mounting bracket (30) for mounting an automatic transmission shift control in the cab of a truck has a top wall (34) and laterally spaced apart side walls (36, 38) depending from the top wall and extending rearward into covering relation to laterally opposite sides of the shift control. A face plate (70) spans the side walls of the bracket in covering relation to the shift control, and a shift lever (62) for operating the shift control to shift the transmission extends from the shift control through an opening (72) at the face plate to provide a grip by which a driver of the vehicle can operate the shift control. The side walls are symmetric about an imaginary medial plane that perpendicularly bisects an imaginary plane occupied by the top wall. The side walls also have symmetric hole patterns (50, 52) providing shift cable attachment features that are symmetric about the imaginary medial plane. The bracket may be used in either a right- or left-hand drive vehicle.

17 Claims, 2 Drawing Sheets

MOUNTING BRACKET FOR AUTOMATIC TRANSMISSION SHIFT CONTROL

FIELD OF THE INVENTION

This invention relates generally to automotive vehicles, and more particularly to mounting a shift control for an automatic transmission in a truck cab.

BACKGROUND AND SUMMARY OF THE INVENTION

A known construction for mounting an automatic transmission shift control in a truck cab is shown in Prior Art FIG. 1 of the drawings. The view is taken from the left front of the vehicle. The shift control comprises an assembly 10 that is mounted by a system of various mounting brackets. Such brackets are stamped metal parts. The assembly 10 is a mechanism that includes a shift handle 12, a lever for example, for operating the shift control to different positions that place the vehicle's automatic transmission in corresponding gears, PARK, REVERSE, NEUTRAL, and one or more forward DRIVE gears. Operative coupling of the shift control to the transmission is by a sheathed cable 14. One of the mounting brackets is a cable hanger bracket 16 that engages the cable sheath to ground the sheathed cable proximate the shift control. Other mounting brackets 18, 20 fasten to opposite sides 22, 24 of the shift control body. A face plate 26 covers the shift control body and contains a slot through which shift handle 12 passes from the shift control mechanism to a grip that can be manually grasped by the driver of the truck to operate the shift control to place the transmission in a desired gear.

The present invention relates to a novel one-piece mounting bracket for mounting a shift control in a truck cab. The inventive mounting bracket reduces the number of separate parts that must be assembled together to install a shift control in a vehicle. Moreover, the inventive mounting bracket possesses certain symmetry that enables it to be used in both right- and left-hand drive vehicles, thereby eliminating a need for unique parts for each of those types of vehicle.

The foregoing, along with further features and advantages of the invention, will be seen in the following disclosure of a presently preferred embodiment of the invention depicting the best mode contemplated at this time for carrying out the invention. The disclosure includes drawings, briefly described as follows.

DESCRIPTION OF THE PREFERRED EMBODIMENT

Figure 1:
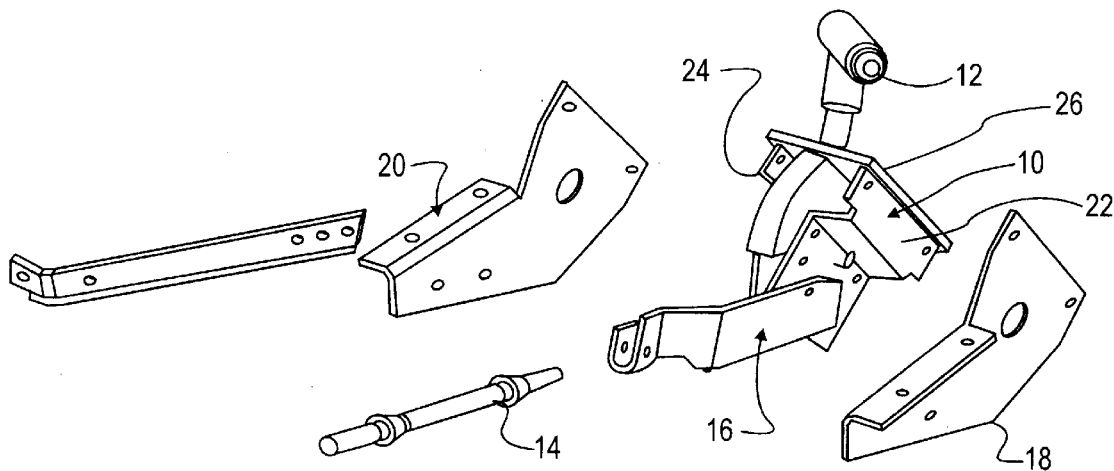
FIG. 1 is an exploded perspective view representing prior art.
Figure 2:
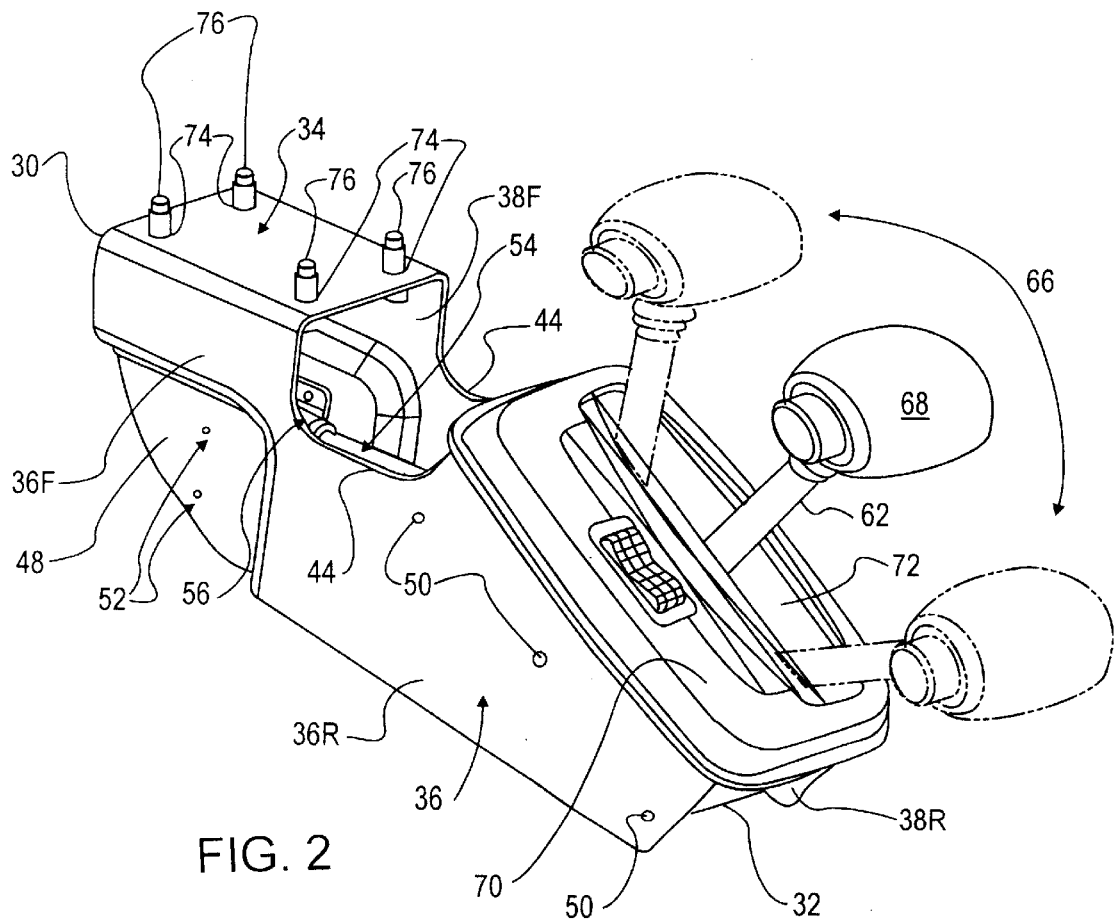
FIG. 2 is a perspective view of a mounting bracket that embodies principles of the invention, including a shift control.
Figure 3:
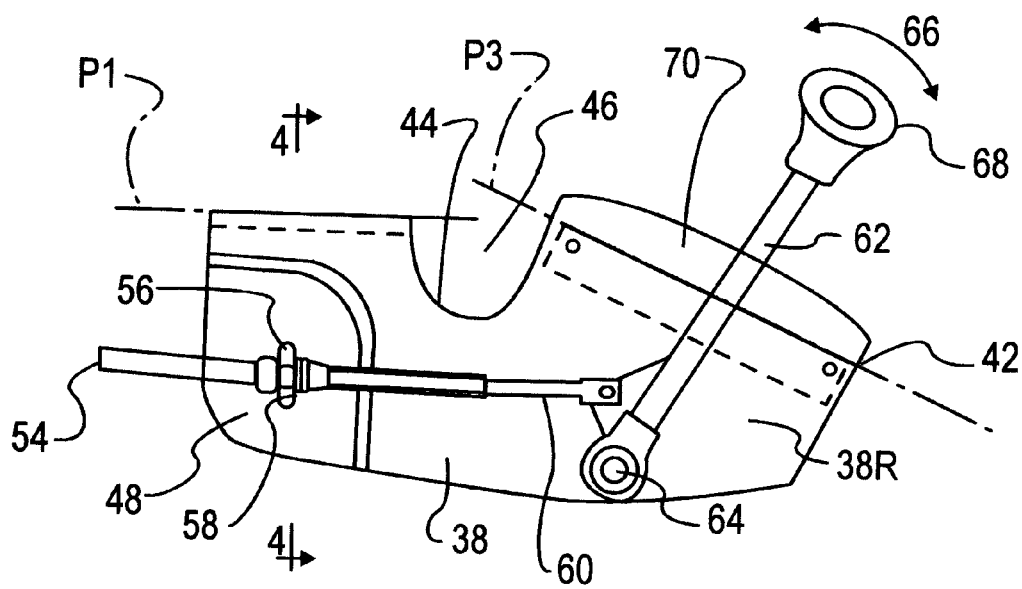
FIG. 3 is a side elevation view of FIG. 2 with portions broken away.
Figure 4:
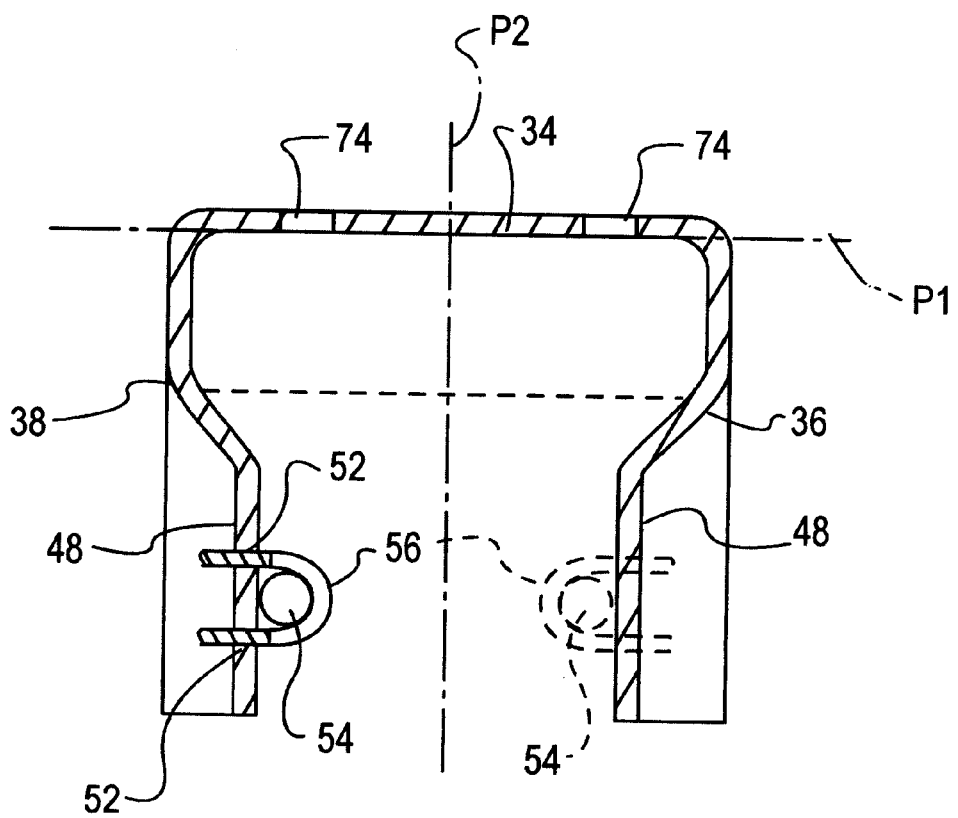
FIG. 4 is a cross section view, on an enlarged scale, in the direction of arrows 4—4 in FIG. 3.

FIGS. 2, 3, and 4 show an exemplary embodiment of the present invention comprising a mounting bracket 30 that mounts an automatic transmission shift control 32 in a truck cab. Bracket 30 is a formed one-piece part, stamped metal for example, and comprises a top wall 34 and laterally spaced apart left and right side walls 36, 38 respectively depending from top wall 34. Each side wall 36, 38 has a respective forward side wall portion 36F, 38F immediately below top wall 36. Extending rearward, each side wall has a respective rear side wall portion 36R, 38R.

Shift control 32 is disposed laterally between rear side wall portions 36R, 38R such that those rear side wall portions are covering laterally opposite sides of the shift control. Rear side wall portions 36R, 38R have respective top margins 42 that are spaced apart laterally so that the entire rear portion of bracket 30 between rear side wall portions 36R, 38R is open for accommodation of shift control 32.

Top wall 34 occupies an imaginary plane P1 that is generally horizontal. Side walls 36, 38 are symmetric about an imaginary medial plane P2 that perpendicularly bisects the imaginary plane occupied by the top wall. Top margins 42 occupy an imaginary plane P3 that intersects imaginary plane P1. Side walls 36, 38 comprise additional top margins 44 extending forward from top margins 42. Top margins 44 have shapes that define notches 46 in side walls 36, 38 between top wall 34 and top margins 42. Each forward side wall portion 36F, 38F comprises an indented area 48, each of which is a mirror image of the other about medial plane P2.

Bracket 30 has a number of holes. Side walls 36, 38 have hole patterns that are symmetric about medial plane P2. Certain of the holes in those patterns, such as holes 50, provide for attachment of shift control 32 to bracket 30 by suitable fasteners (not shown). Other holes, such as holes 52, provide cable attachment features for grounding a sheathed cable 54 that operatively couples shift control 32 to a multi-gear or variable ratio transmission (not shown) of the vehicle. The drawings show the grounding of cable 54 to right side wall 38, representing a left-hand drive vehicle installation. Two holes 52 are provided in indented area 48 of side wall 38. A U-shaped fastener 56 has a throat that cooperates with the side wall to capture the sheathed cable. The fastener throat fits over the sheathed cable on the interior of bracket 30. The free ends of the fastener pass through the respective holes 52, and are secured in any suitable manner to constrain a sheath 58 without impeding movement of a cable 60 within the sheath. FIG. 3 shows an end of cable 60 exiting sheath 58 and attached to shift control 32. FIG. 4 shows, in phantom, grounding of sheathed cable 54 to the opposite side wall, representing an alternate right-hand drive vehicle installation, thereby demonstrating the utility of bracket 30 as a part which can be used in either a left- or right-hand drive vehicle.

A shift lever 62 is mounted at a pivot 64 for motion in the sense indicated by the double-headed arrow 66. Shift lever 62 extends from shift control 32 to a distal end that contains a grip 68 which can be grasped by a driver of the vehicle to operate shift lever 62. Cable 60 attaches to shift lever 62 at a location spaced from pivot 64, and so when shift lever 62 is pivoted, it moves cable 60 within sheath 58. The opposite end of the sheathed cable is associated with the vehicle transmission such that the motion imparted to cable 60 by shift lever 62 places the transmission in a gear or ratio corresponding to a gear or ratio position selected by the shift lever.

A face plate 70 is disposed on top margins 42 and fastened to bracket 30 to thereby cover the otherwise open top of the interior of bracket 30 within which shift control 32 is disposed. Face plate 70 has a slot 72 through which shift lever 62 passes. Alongside slot 72, face plate 70 may have a row of gear selector indicia identifying gear positions of the transmission correlated with positions of shift lever 62 along the slot.

A set of four holes 74 in top wall 34 provide a hole pattern for fastening bracket 30 in the truck cab. The shanks of headed screws 76 pass upward through holes 74 to thread into other holes (not shown) thereby fastening the bracket to the vehicle via top wall 34. The fastening may be made to any suitable member(s) and/or panel(s) of the vehicle, such as a dash panel or an instrument panel for example. A portion of such a panel is marked at 80. The lower edge of a center panel that may contain certain controls and/or instrumentation (not shown) for the driver of the truck fits into notches 46. The fastening of bracket 30 to the truck occurs behind the center panel where it is concealed from the driver's view.

While a presently preferred embodiment of the invention has been illustrated and described, it should be appreciated that principles of the invention are applicable to all embodiments that fall within the scope of the following claims.

What is claimed is:

1. An automotive vehicle comprising a powertrain including a multi-gear transmission that is placed in a selected gear by a shift control that is remote from the transmission, and a one-piece bracket for the shift control, the bracket having a top wall and laterally spaced apart side walls depending from the top wall and extending rearward into covering relation to laterally opposite sides of the shift control, a face plate spanning the side walls of the bracket in covering relation to the shift control, and a shift member for operating the shift control to shift the transmission, the shift member extending from the shift control through an opening at the face plate to provide a grip by which a driver of the vehicle can operate the shift control, in which an operative coupling that includes a sheathed cable couples the shift control to the transmission to correlate different transmission gears to different positions of the shift member, at least a portion of the length of the sheathed cable extends along one of the side walls of the bracket, and a fastener grounds the sheathed cable to that one side wall.

2. An automotive vehicle as set forth in claim 1 in which the fastener comprises a U-shaped member having a throat that cooperates with the one side wall to capture the sheathed cable.

3. An automotive vehicle as set forth in claim 1 in which a forward portion of the one side wall is disposed vertically below the top wall and forward of a rear portion of the one side wall that covers a corresponding one of the laterally opposite sides of the shift control, the forward portion of the one side wall comprises an indentation toward the other side wall, and the fastener grounds the sheathed cable to the one side wall at the indentation.

4. An automotive vehicle as set forth in claim 1 in which the top wall occupies an imaginary plane, and the side walls are symmetric about an imaginary medial plane that perpendicularly bisects the imaginary plane occupied by the top wall.

5. An automotive vehicle as set forth in claim 4 in which the side walls comprise cable attachment features that are also symmetric about the imaginary medial plane.

6. An automotive vehicle as set forth in claim 5 in which the cable attachment features comprise hole patterns.

7. An automotive vehicle as set forth in claim 1 in which the top wall occupies an imaginary plane, and the side walls comprise cable attachment features that are symmetric about an imaginary medial plane that perpendicularly bisects the imaginary plane occupied by the top wall.

8. An automotive vehicle as set forth in claim 1 in which the top wall occupies an imaginary plane, and the side walls comprise hole patterns that are symmetric about an imaginary medial plane that perpendicularly bisects the plane occupied by the top wall.

9. An automotive vehicle as set forth in claim 1 in which the top wall of the bracket occupies an imaginary plane, and portions of the side walls that are in covering relation to laterally opposite sides of the shift control have top margins occupying an imaginary plane that intersects the imaginary plane occupied by the top wall of the bracket.

10. An automotive vehicle as set forth in claim 9 in which the side walls comprise additional top margins extending forward from the top margins of the portions that are in covering relation to laterally opposite sides of the shift control, and the additional top margins have shapes that define notches in the side walls between the top wall and the top margins of the portions that are in covering relation to laterally opposite sides of the shift control.

11. An automotive vehicle as set forth in claim 1 in which the opening at the face plate through which the shift member extends comprises a through-slot in the face plate.

12. An automotive vehicle as set forth in claim 2 including fasteners that are associated with the top wall to attach the bracket to a panel of the vehicle via the top wall.

13. An automotive vehicle that has a powertrain including a multi-gear transmission that is placed in a selected gear by a remote shift control disposed for manual operation by a driver of the vehicle, and a one-piece bracket for mounting the shift control in the vehicle, the bracket comprising a top wall and laterally spaced apart side walls depending from the top wall and extending rearward for covering laterally opposite sides of the shift control, the portions of the side walls that are in covering relation to laterally opposite sides of the shift control comprising top margins that are spaced apart laterally to define an opening, and fasteners that associate with the top wall of the bracket to fasten the bracket to a panel of the vehicle via the top wall of the bracket;

in which the top wall occupies an imaginary plane, and the side walls are symmetric about an imaginary medial plane that perpendicularly bisects the imaginary plane occupied by the top wall; and in which the side walls comprise cable attachment features that are also symmetric about the imaginary medial plane, and an operative coupling that includes a sheathed cable couples the shift control to the transmission, at least a portion of the length of the sheathed cable extends along one of the side walls of the bracket, and a fastener grounds the sheathed cable to that one side wall.

14. An automotive vehicle that has a powertrain including a multi-gear transmission that is planed in a selected gear by a remote shift control disposed for manual operation by a driver of the vehicle, and a one-piece bracket for mounting the shift control in the vehicle, the bracket comprising a top wall and laterally spaced apart side walls depending from the top wall and extending rearward for covering laterally opposite sides of the shift control, the portions of the side walls that are in covering relation to laterally opposite sides of the shift control comprising top margins that are spaced apart laterally to define an opening, and fasteners that associate with the top wall of the bracket to fasten the bracket to a panel of the vehicle via the top wall of the bracket; and in which one of the side walls comprises cable attachment features, and an operative coupling that includes a sheathed cable couples the shift control to the transmission, at least a portion of the length of the sheathed cable extends along the one side wall of the bracket, and a fastener grounds the sheathed cable to that one side wall.

15. An automotive vehicle as set forth in claim 14 in which the top wall occupies an imaginary plane, and the side walls comprise cable attachment features that are symmetric about an imaginary medial plane that perpendicularly bisects the plane occupied by the top wall.

16. An automotive vehicle as set forth in claim 15 in which portions of the side walls that are in covering relation to laterally opposite sides of the shift control have top margins occupying an imaginary plane that intersects the imaginary plane occupied by the top wall of the bracket.

17. An automotive vehicle as set forth in claim 16 in which the side walls comprise additional top margins extending forward from the top margins of the portions that are in covering relation to laterally opposite sides of the shift control, and the additional top margins have shapes that define notches in the side walls between the top wall and the top margins of the portions that are in covering relation to laterally opposite sides of the shift control.

* * * * *